(12) United States Patent
Gilra

(10) Patent No.: US 7,956,869 B1
(45) Date of Patent: Jun. 7, 2011

(54) PROXIMITY BASED TRANSPARENCY OF WINDOWS AIDING IN OBSCURED WINDOW SELECTION

(75) Inventor: Anant Gilra, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 757 days.

(21) Appl. No.: 11/827,726

(22) Filed: Jul. 13, 2007

(51) Int. Cl.
- *G09G 5/08* (2006.01)
- *G09G 5/02* (2006.01)
- *G09G 5/00* (2006.01)
- *G06F 3/048* (2006.01)

(52) U.S. Cl. ........ 345/592; 345/619; 345/157; 715/759; 715/764; 715/781; 715/856

(58) Field of Classification Search ................ 345/418, 345/592, 619, 629, 650, 156–157, 160; 382/282–283; 715/273, 700, 759, 764, 781, 715/783, 856
See application file for complete search history.

(56) References Cited

U.S. PATENT DOCUMENTS

| | | | | |
|---|---|---|---|---|
| 5,784,214 A * | 7/1998 | Peng | | 359/808 |
| 2004/0108992 A1 * | 6/2004 | Rosenberg | | 345/156 |
| 2004/0179017 A1 * | 9/2004 | Martyn et al. | | 345/536 |
| 2005/0200934 A1 * | 9/2005 | Callahan et al. | | 359/265 |
| 2007/0101282 A1 * | 5/2007 | Goossen et al. | | 715/764 |
| 2007/0245256 A1 * | 10/2007 | Boss et al. | | 715/768 |

OTHER PUBLICATIONS

Ina Fried, Apple Seeks Patent for See-Through Windows, Published on ZDNet News, May 18, 2004, http://news.zdnet.com/2100-3513_22-5214974.html.

Experience Windows Vista, Windows Aero, The Basic User Experience, May 3, 2007, http://www.microsoft.com/windows/products/windowsvista/features/experiences/aero.mspx.

In A Fried, Apple Seeks Patent for See-Through Windows, Published on ZDNet News, May 18, 2004, http://news.zdnet.com/2100-3513_22-5214974.html.

* cited by examiner

*Primary Examiner* — Wesner Sajous
(74) *Attorney, Agent, or Firm* — Van Pelt, Yi & James LLP

(57) ABSTRACT

A cursor location associated with a user controlled cursor is obtained. For each of a plurality of windows, a respective distance to the user controlled cursor is determined based at least in part on the cursor location. A transparency value for each of the plurality of windows is determined based at least in part on the respective distance. The plurality of windows is displayed, wherein at least a portion of each window is displayed based on its corresponding transparency value.

19 Claims, 13 Drawing Sheets (8 of 13 Drawing Sheet(s) Filed in Color)

PROXIMITY BASED TRANSPARENCY OF WINDOWS AIDING IN OBSCURED WINDOW SELECTION

BACKGROUND OF THE INVENTION

Windows are commonly used in operating systems to display folders (i.e., directories), files, and other data objects such as applications. Within applications, windows may be used to display files and documents. When there are many windows open, users may find it difficult to find and/or select windows since windows may be overlapping and obscured partially or wholly from view. For example, a user may have to rearrange windows on a desktop in order to find and select a desired window, or a user may need to select multiple windows from a task bar before finding a desired window. Improvements in finding and/or selecting a window would be useful.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
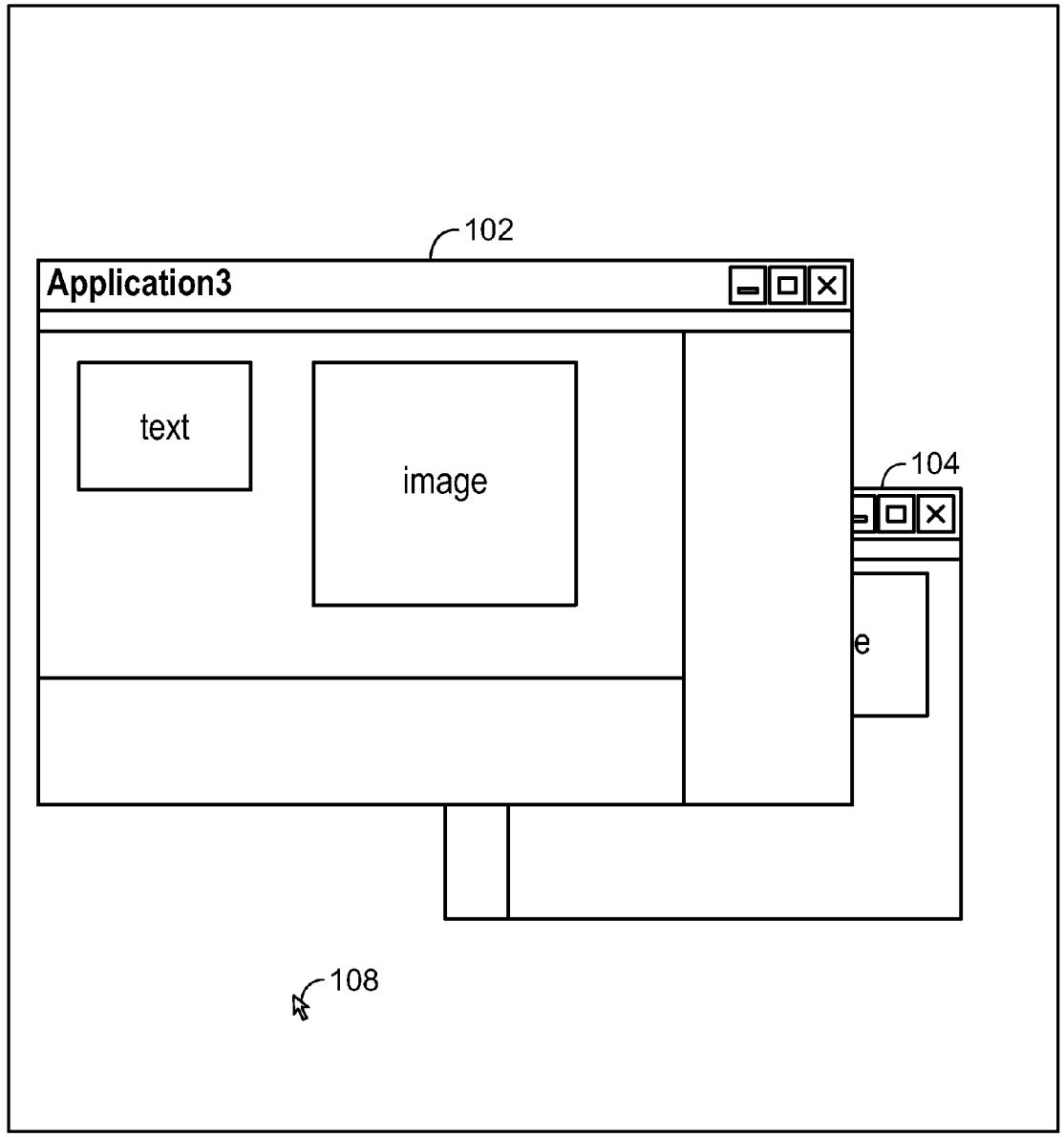
FIG. 1 is a diagram illustrating an embodiment of an interface for viewing windows when a transparency mode is disabled.

FIG. 1 is a diagram illustrating an embodiment of an interface for viewing windows when a transparency mode is disabled. In some embodiments, when transparency mode is disabled, all windows are displayed with 0% transparency (where 0% transparency corresponds to 100% opaque, and 100% transparency corresponds to invisible). In this example, three windows are open, but only two windows, window 102 and window 104 are visible. Window 102 overlaps with and is above window 104 so that window 104 is partially obscured by window 102. Window 104 is above a third window so that the third window is fully obscured by window 104. A user wishing to view window 104 could use cursor 108 to move window 102 off of window 104 or perhaps resize window 102 so it no longer overlaps with window 104. A user wishing to view and/or select the third window could then move window 104 aside so that the third window is revealed. This may be undesirable in that it takes additional time and alters the layout (e.g., position and/or sizes) of the windows. In cases in which there are many obscured or partially obscured windows, the user may have to rearrange the windows multiple times before finding and/or selecting a desired window.

In this example, each window corresponds to a different application on an operating system desktop. In some embodiments, each window configured according to the techniques disclosed herein corresponds to a window at the operating system level, such as folders, directories, files, and applications. For example, windows associated with Microsoft, Macintosh, Linux, and other operating systems may be configured as described herein. Other operating systems include operating systems associated with mobile devices, such as mobile phones, personal digital assistants, etc. In some embodiments, windows configured to perform the techniques disclosed herein are within an application and each window corresponds to a particular file or dialog (e.g., to view and/or control application values, settings, or parameters). Examples of applications that may be configured as described herein include Adobe® Acrobat®, Adobe® Flash®, Adobe® Fireworks®, Adobe® Illustrator®, word processing applications, image editing applications, web browsers, etc.

Figure 2A:
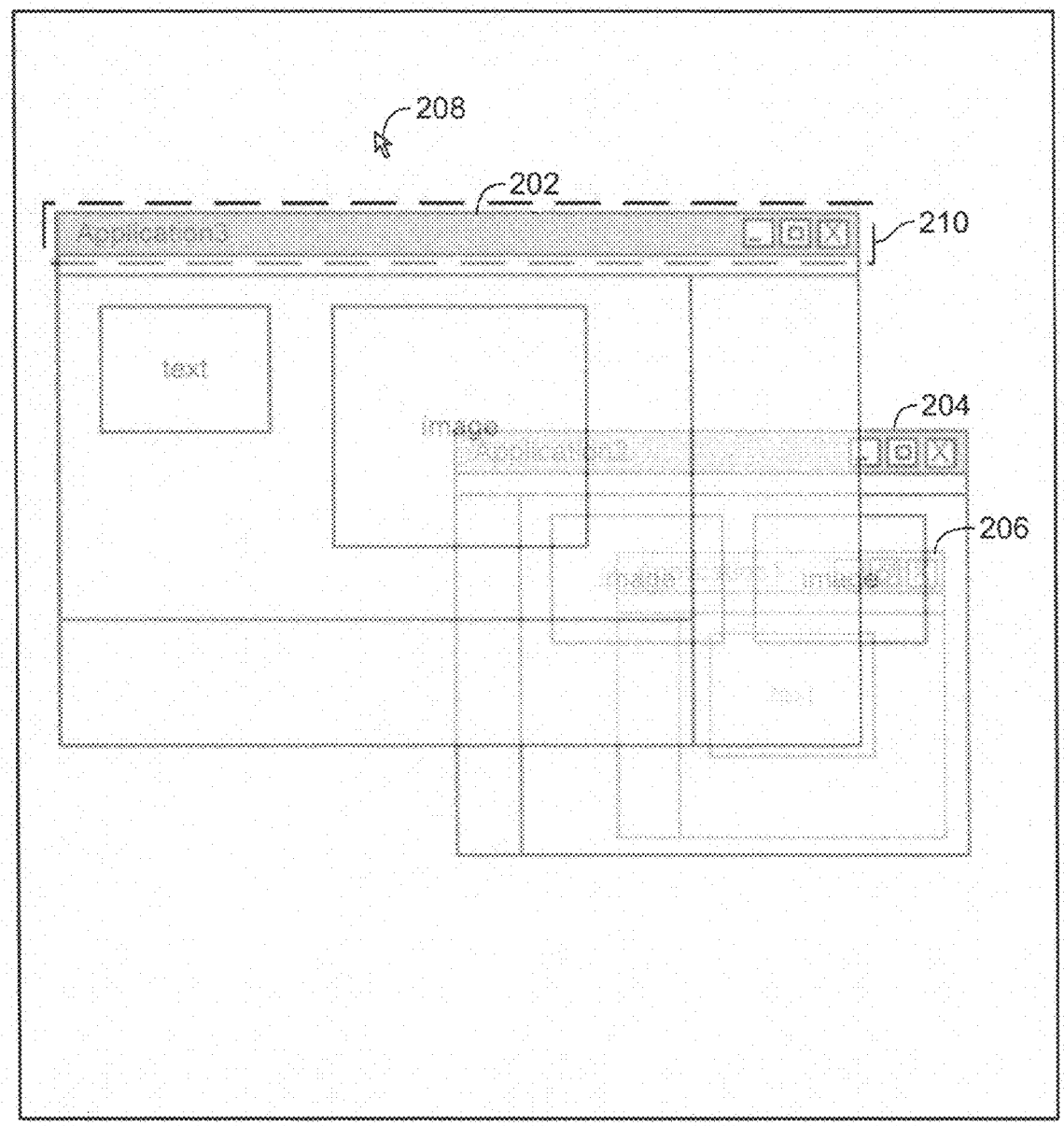
FIG. 2A is a diagram illustrating an embodiment of an interface for viewing windows when a transparency mode is enabled.

FIG. 2A is a diagram illustrating an embodiment of an interface for viewing windows when a transparency mode is enabled. In some embodiments, when transparency mode is enabled, one or more windows are displayed with transparency values in the range of 0% to 100%. In this example, three windows are open, and all three windows are visible since each is transparent. As used herein, a window is transparent if at least a portion of it is displayed with nonzero transparency (i.e., (0%, 100%]). In other embodiments, transparency may be represented in a different way (i.e., 0% may correspond to invisible). Window 204 completely covers window 206, but because window 204 is transparent, window 206 is visible. In the example shown, the windows are displayed with various transparencies. A user wishing to view and/or select the window 206 does not need to move window 204 aside in order to view and/or select window 206.

As shown, cursor 208 is not over any window at this point. As more fully described below, in some embodiments, when the user moves cursor 208 so that it hovers over window 206, window 206 is made less transparent and/or is brought to the front. This may be desirable in that it saves time in finding and/or selecting a window. In cases in which there are multiple obscured or partially obscured windows, the user does not need to rearrange windows before finding the desired window. In various embodiments, a user may move cursor 208 using a mouse, a touchpad, a pointing device, a keyboard, or any other appropriate device.

In some embodiments, the transparency of the windows varies depending on the location of the cursor. For example, as the cursor moves closer to a window, the transparency level for that window decreases so that the window is more opaque and more visible. In some embodiments, only a portion of the window has varying transparency. For example, the bodies of the windows are displayed with a transparency that varies with the location of the cursor, while the headers are displayed with a constant transparency (e.g., 50%). For example, if the cursor is located far away from the windows, all of the windows may be at 100% transparency making it difficult to determine where the windows are located. Having the headers (or outline or some other portion of the window) have a constant transparency may give the user a sense of where all the windows are and where to hover the cursor if he is interested in viewing the window with greater visibility (i.e., with lower transparency). A header refers to the top portion of a window. In some embodiments, a header is a portion of a window containing the title, such as header 210 of window 202 (containing title "Application3").

In some embodiments, as a cursor moves closer to a window, the window may move up with respect to other windows. For example, as a cursor moves close to or on the header of window 206, window 206 may move above windows 202 and/or 204. When the cursor moves away from or off window 206, window 206 moves back down to its original layer. This may be useful so that the top most window can be selected and brought into focus even if it is covered by other windows. In some operating systems and/or applications, windows at lower layers are displayed at lower transparencies. In such cases, this feature may be useful in order to make window 206 have greater visibility, especially in cases where there are many windows layered over one another, and even if they are transparent, it may be difficult to view contents of a window that is at one of the lower layers. In some embodiments, moving windows up or down in layers in response to the cursor location is user configurable.

In some embodiments, when a window is selected, transparency mode is disabled. In some embodiments, to select a window, a user hovers the cursor over a window (e.g., the header) and clicks a mouse button. In some embodiments, in response to being selected, a window moves to the top layer (that is, it is not necessary for a window to be on top or be exposed where the cursor is located above a window). In some embodiments, all non-selected windows move back to the layer they were in prior to entering transparency mode.

Figure 2B:
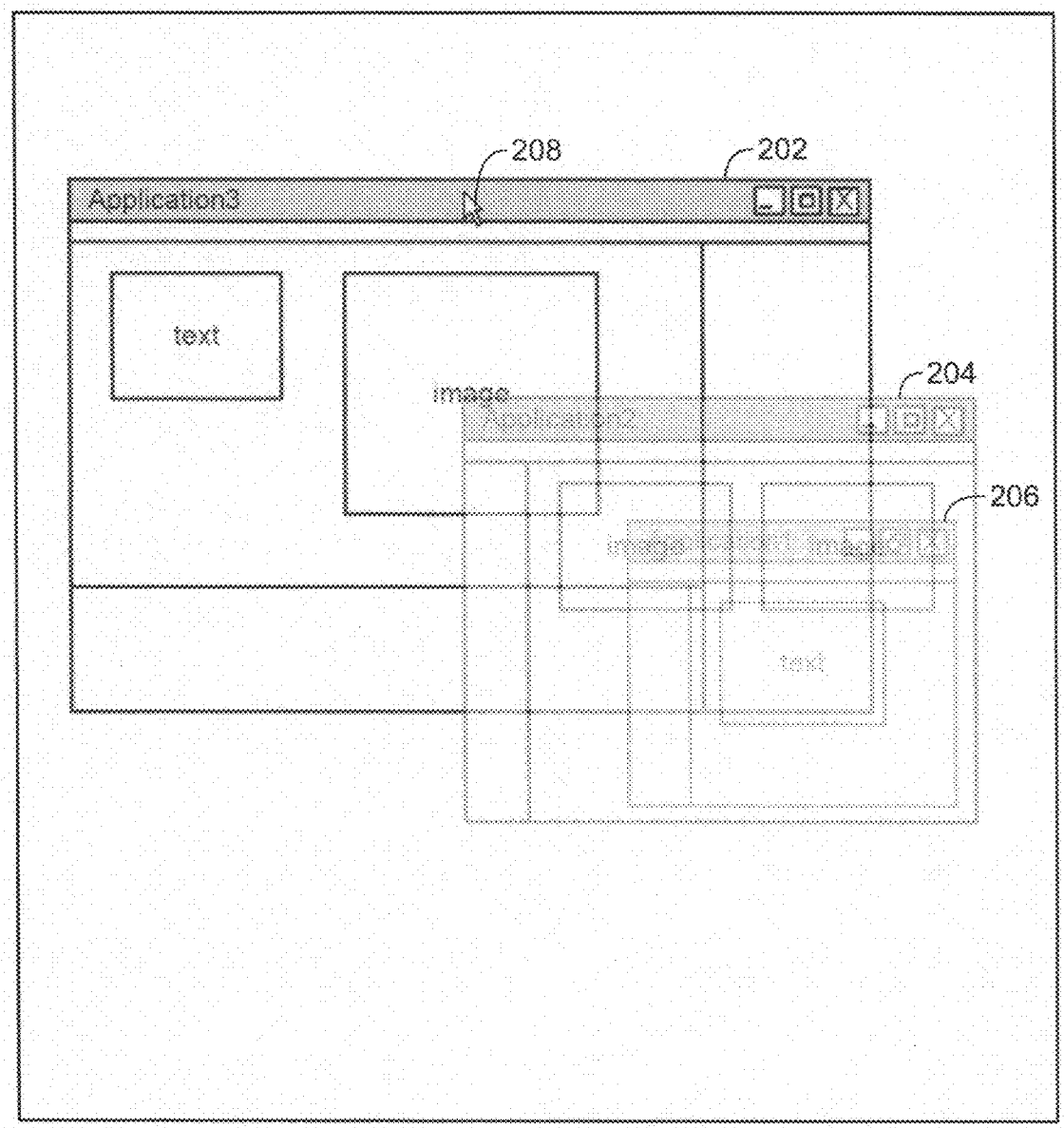
FIG. 2B is a diagram illustrating an embodiment of an interface for viewing windows when a transparency mode is enabled with a cursor in a second position.

FIG. 2B is a diagram illustrating an embodiment of an interface for viewing windows when a transparency mode is enabled with a cursor in a second position. In this example, a user has moved cursor 208 so that it is hovering over the header of window 202. In this example, transparency varies based on a window's distance to a cursor and as a result, window 202 is displayed with a transparency of 5%, window 204 is displayed with a transparency of 40%, and window 206 is displayed with a transparency of 60%. In some embodiments, the further away the window from the mouse cursor, the more the transparency. The distance of mouse could be measured from the header midpoint or top left of header, or top right of header.

In some embodiments, the headers of all the windows have a constant transparency of, for example, 50%. That is, in some embodiments, transparency for at least a portion of the window does not vary with distance to a cursor. In some embodiments, whether the header transparency stays constant (and the value of the constant transparency) is user configurable.

In some embodiments, as the cursor moves across the display area, the transparencies of the windows dynamically adjust based on the location of the cursor. In some embodiments, the transparencies of the windows adjust in response to an event, such as a change in location of the cursor. In some embodiments, the transparencies adjust periodically, e.g., at fixed intervals of time.

In some embodiments, as the cursor moves across the display area, the transparencies of the windows adjust in a smooth or continuous manner based on the location of the cursor. For example, transparency is a linear function of distance between the cursor and a given window. In some embodiments, the transparencies of the windows vary in a discrete or step-like fashion.

In some embodiments, the display area or screen is divided into equal sized rectangular portions (in a grid fashion). Transparencies are calculated when the mouse leaves one such portion so that transparencies of windows would be the same while the cursor is in the same portion. This may be useful to handle minor mouse movements due to jerks etc., so that there would not be a need to recalculate and re-render the windows.

In some embodiments, there is a caching of screen images per portion. As a cursor moves between the portions, the calculation of what to render has to be done only the first time for each portion, and after that the cached image is rendered. On mouseDrag, resizing etc., the cached images would need to be redone.

Figure 2C:
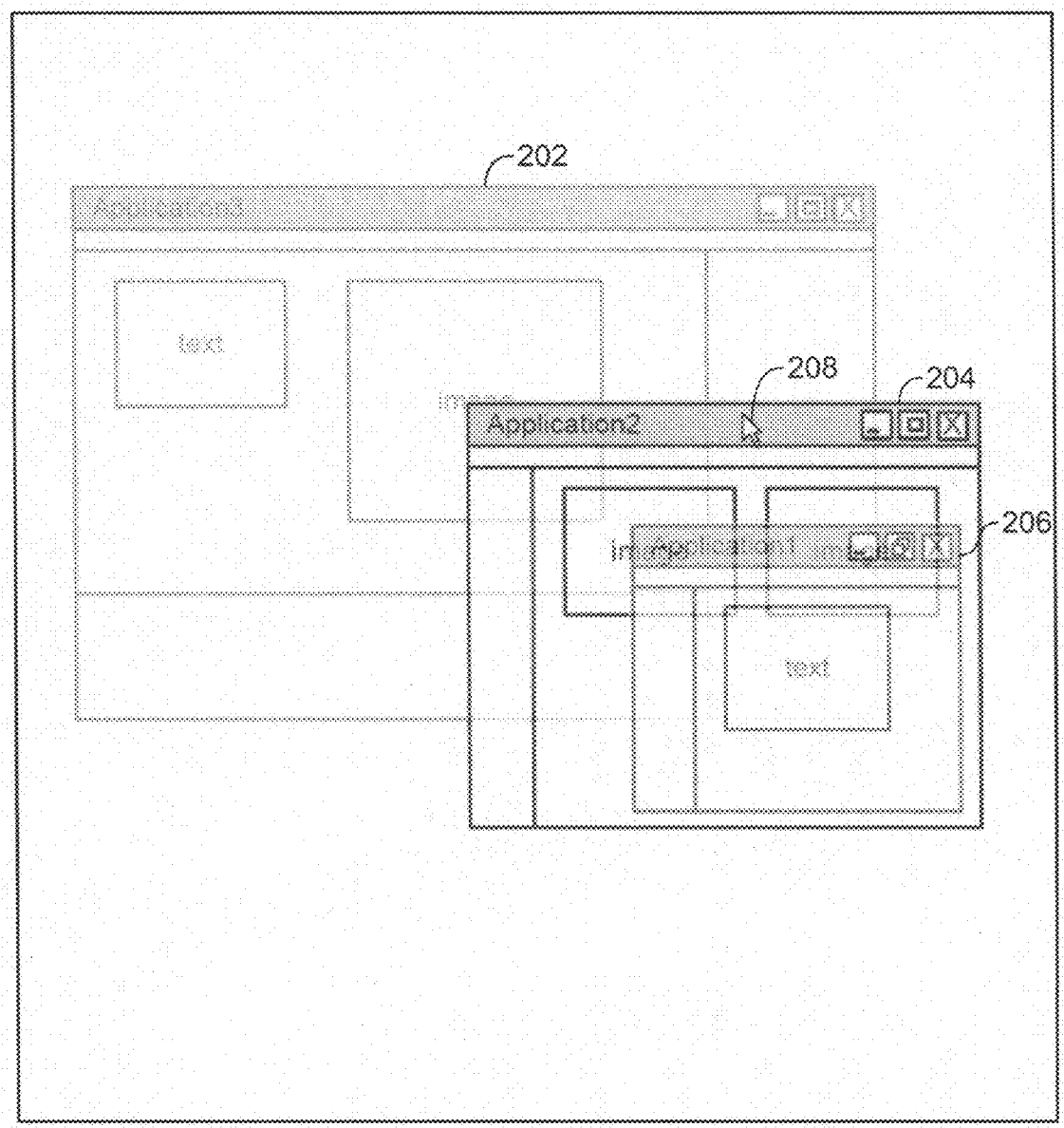
FIG. 2C is a diagram illustrating an embodiment of an interface for viewing windows when a transparency mode is enabled with a cursor in a third position.

FIG. 2C is a diagram illustrating an embodiment of an interface for viewing windows when a transparency mode is enabled with a cursor in a third position.

In this example, a user has moved cursor 208 so that it is hovering over the header of window 204. As a result, window 204 is displayed with a transparency of 5%, window 202 is displayed with a transparency of 40%, and window 206 is displayed with a transparency of 25%. In addition, in this example, window 204 is moved to the top layer (so that window 202 is behind window 204, and window 206 is behind window 202). In some embodiments, the window that is closest in distance to the cursor is moved to the top layer, where distance can be defined in various ways, as more fully described below.

Figure 2D:
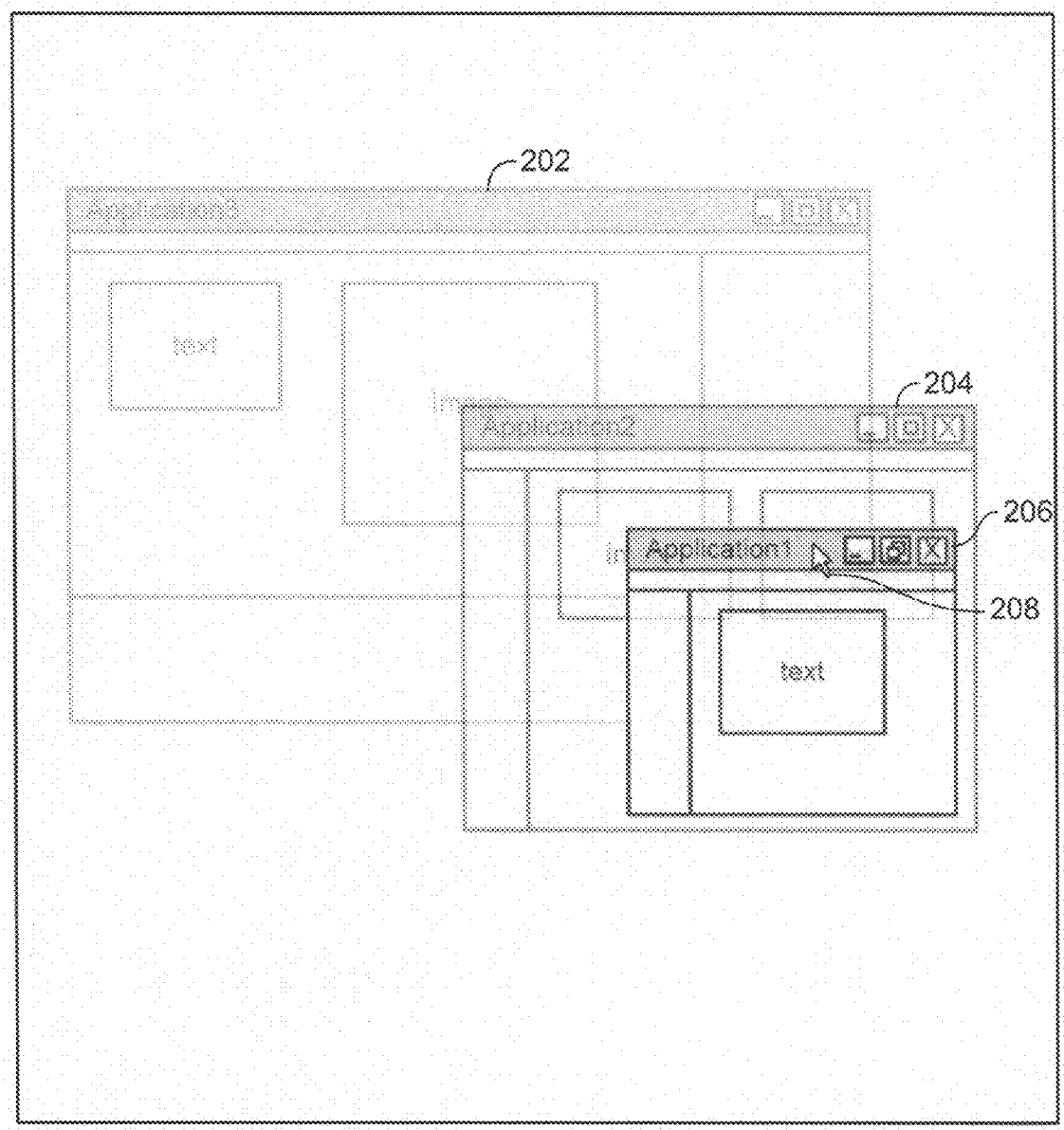
FIG. 2D is a diagram illustrating an embodiment of an interface for viewing windows when a transparency mode is enabled with a cursor in a fourth position.

FIG. 2D is a diagram illustrating an embodiment of an interface for viewing windows when a transparency mode is enabled with a cursor in a fourth position. In this example, a user has moved cursor 208 so that it is hovering over the header of window 206. As a result, window 206 is displayed with a transparency of 5%, window 202 is displayed with a transparency of 60%, and window 204 is displayed with a transparency of 25%. In addition, in this example, window 206 is moved to the top layer (so that window 202 is behind window 206, and window 204 is behind window 202). The other windows retain the same layering or stacking order. If at this point, the user selects window 206 (e.g., by clicking on it), in some embodiments, transparency mode is disabled. The selected window remains at the top.

Figure 2E:
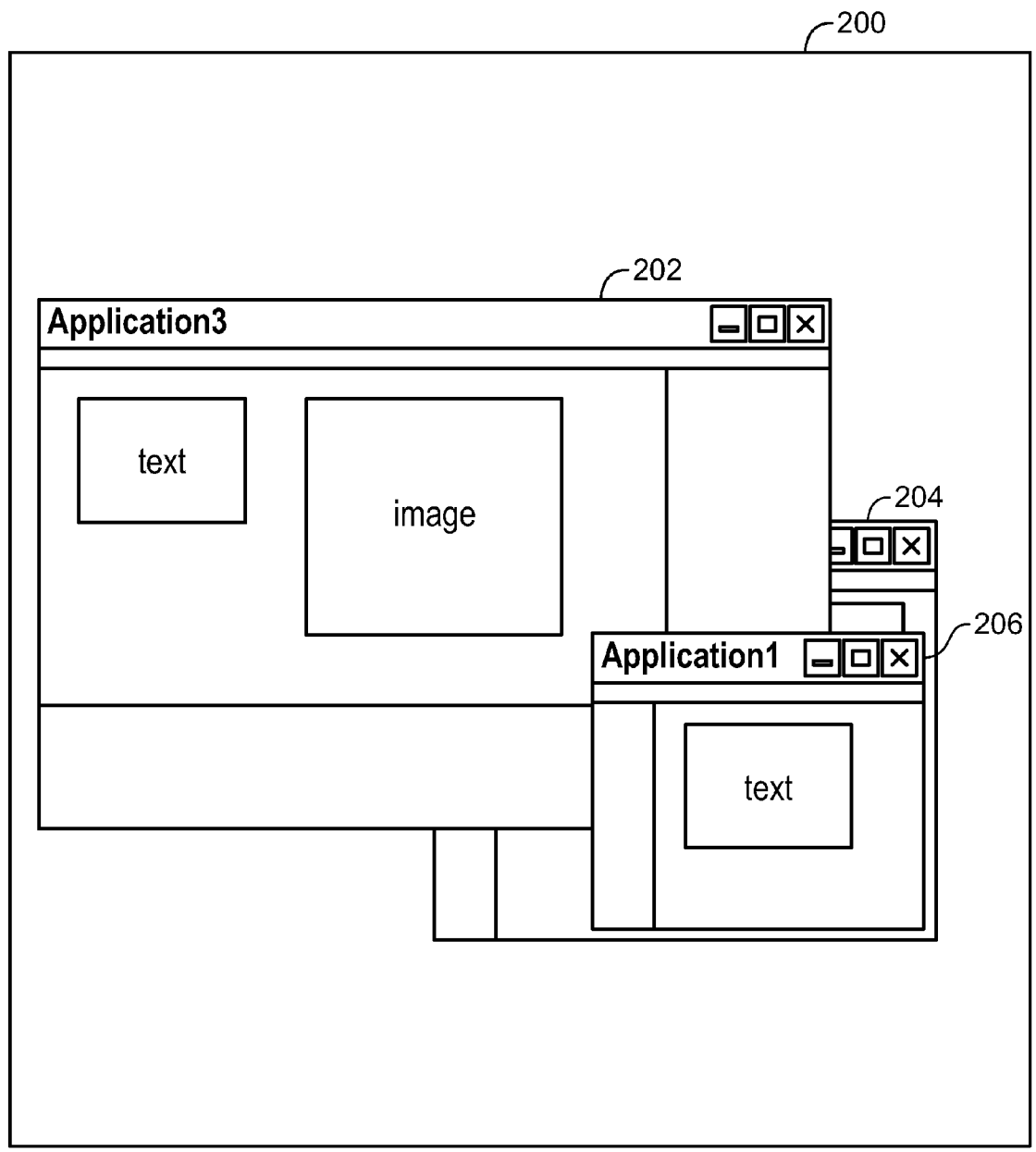
FIG. 2E is a diagram illustrating an embodiment of an interface for viewing windows when a transparency mode is disabled because a user selects a window.

FIG. 2E is a diagram illustrating an embodiment of an interface for viewing windows when a transparency mode is disabled because a user selects a window. In this example, a user has selected window 206. For example, in FIG. 2D, the user may hover cursor 208 over the header of window 206 and then click a mouse button. As a result, all windows are displayed with 0% transparency (including the headers), and window 206 is brought to the top layer (if it is not already at the top layer just prior to exiting transparency mode).

In other embodiments, when transparency mode is disabled or when a user selects a window, all windows other than the selected window are displayed with 100% transparency. In other words, only the selected window is visible. In some embodiments, the headers of all windows other than the selected window are visible (e.g., displayed at 50% transparency) so that only the selected window and the headers of the other windows are visible. In some embodiments, as soon as the cursor is moved off of the selected window, transparency mode is entered again and all the windows are visible again at varying levels of transparency as more fully described below.

Although windows 202-206 are shown as applications on desktop 200, in various embodiments, desktop 200 could be any appropriate display area. For example, desktop 200 could be a display area within an application (e.g., a word processing application, image viewing or editing application, web browser, etc.). For example, within an image editing application, multiple images may be open in multiple windows and/or dialog boxes or editing tools may be open in multiple windows. In some embodiments, if a dialog is modal (i.e., disables the application until it is closed), then transparency mode does not apply to the dialog window. Within a web browser, multiple browsing windows may be open to different web pages and/or a bookmark or other window may be open. Within these and other applications, a transparency mode may be enabled or disabled and behave in a similar manner to the examples disclosed herein.

In some embodiments, transparency mode applies only to a subset of windows that are open. For example, a user may desire to have certain windows always displayed with 0% transparency, such as a clock. Within an application, it may be desirable to have windows associated with editing tools and dialog boxes always displayed with 0% transparency while windows containing files have varying transparency.

In various embodiments, the transparency may vary in different increments from that shown in the examples of FIGS. 2A-2E. For example, a first window under a cursor may have a transparency of 20%, a second window near the cursor may have a transparency of 25%, and a third window farther away may have a transparency of 40%. In some embodiments, an equation is used to determine the transparency of a window, as more fully described below.

Figure 3A:
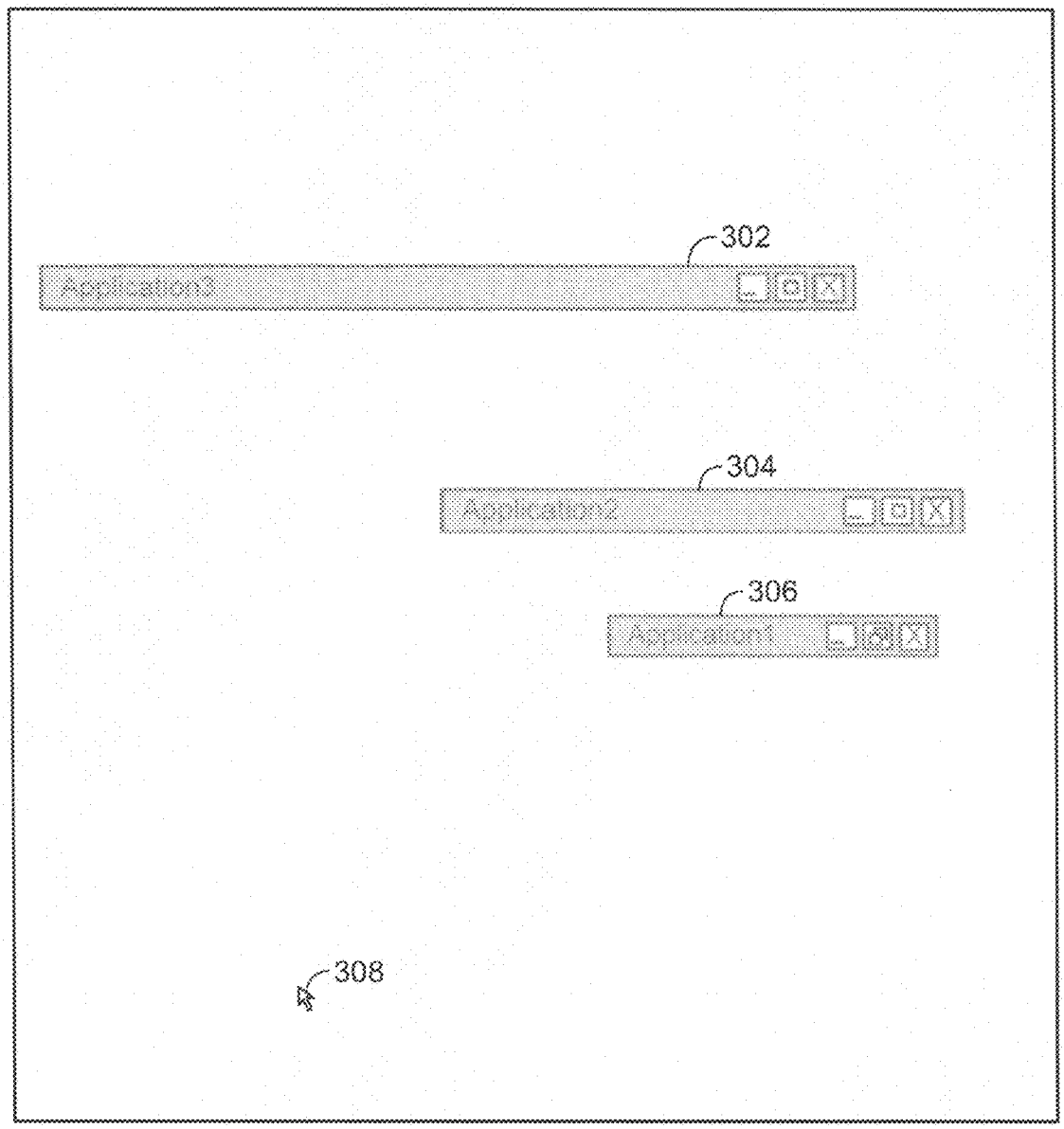
FIG. 3A is a diagram illustrating an embodiment of an interface for viewing windows when a transparency mode is enabled with different transparency values for the header and body.

FIG. 3A is a diagram illustrating an embodiment of an interface for viewing windows when a transparency mode is enabled with different transparency values for the header and body. In this example, the header of each of windows 302-306 is displayed with 50% transparency, and the body of each of windows 302-306 is displayed with 100% transparency. Cursor 308 is not over any window at this point.

Figure 3B:
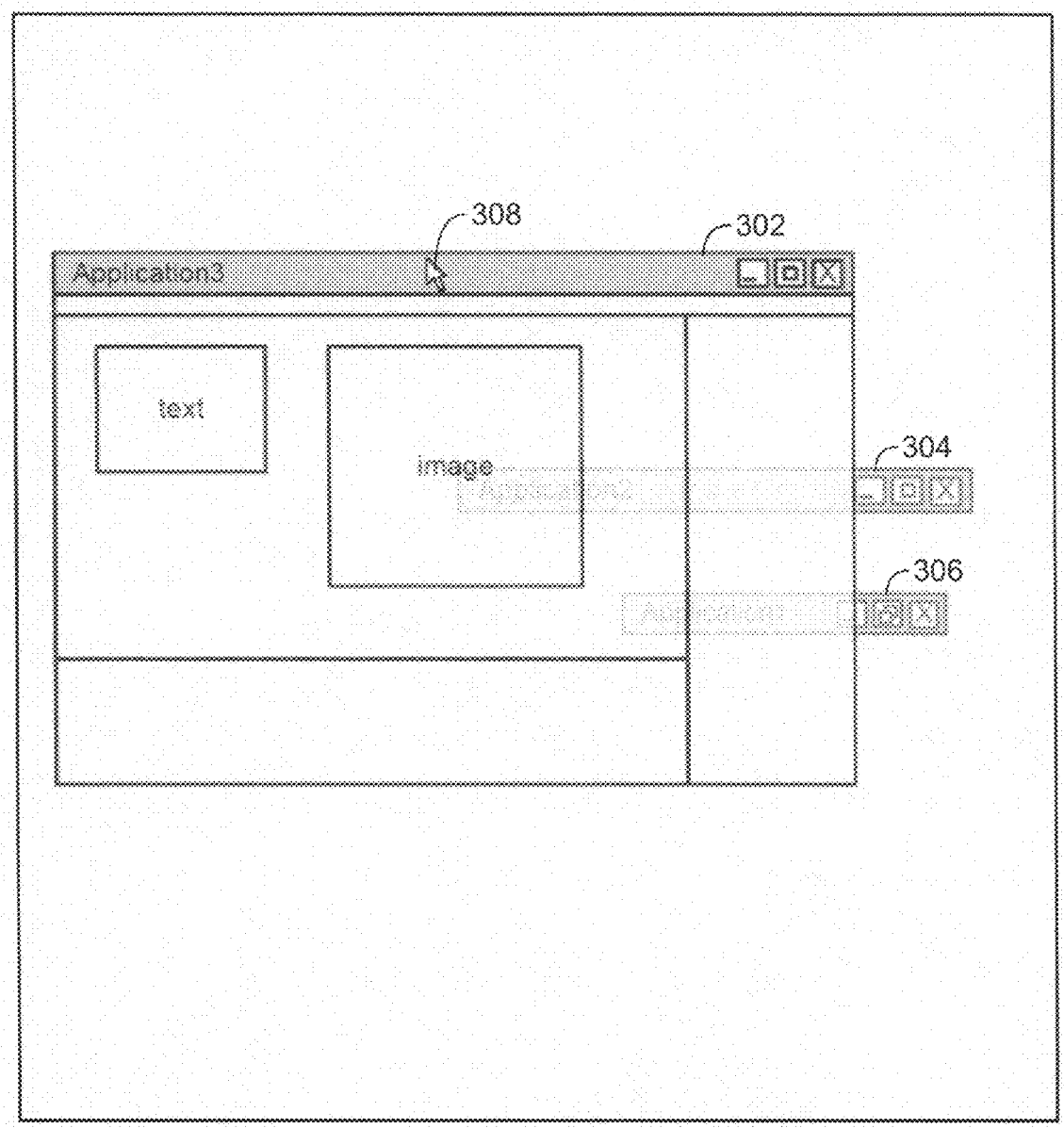
FIG. 3B is a diagram illustrating an embodiment of an interface for viewing windows when a transparency mode is enabled with different transparency values for the header and body and a cursor in a second position.

FIG. 3B is a diagram illustrating an embodiment of an interface for viewing windows when a transparency mode is enabled with different transparency values for the header and body and a cursor in a second position. In this example, a user has moved cursor 308 so that it is hovering over the header of window 302. As a result, window 302 is displayed with a transparency of 25%, while the bodies of windows 304 and 306 each remain displayed with a transparency of 100% and the headers of windows 304 and 306 each remain displayed with a transparency of 50%. In some embodiments, the headers of all the windows have a constant transparency of 50%. In some embodiments, whether the header transparency stays constant (and the value of the constant transparency) is user configurable.

Figure 3C:
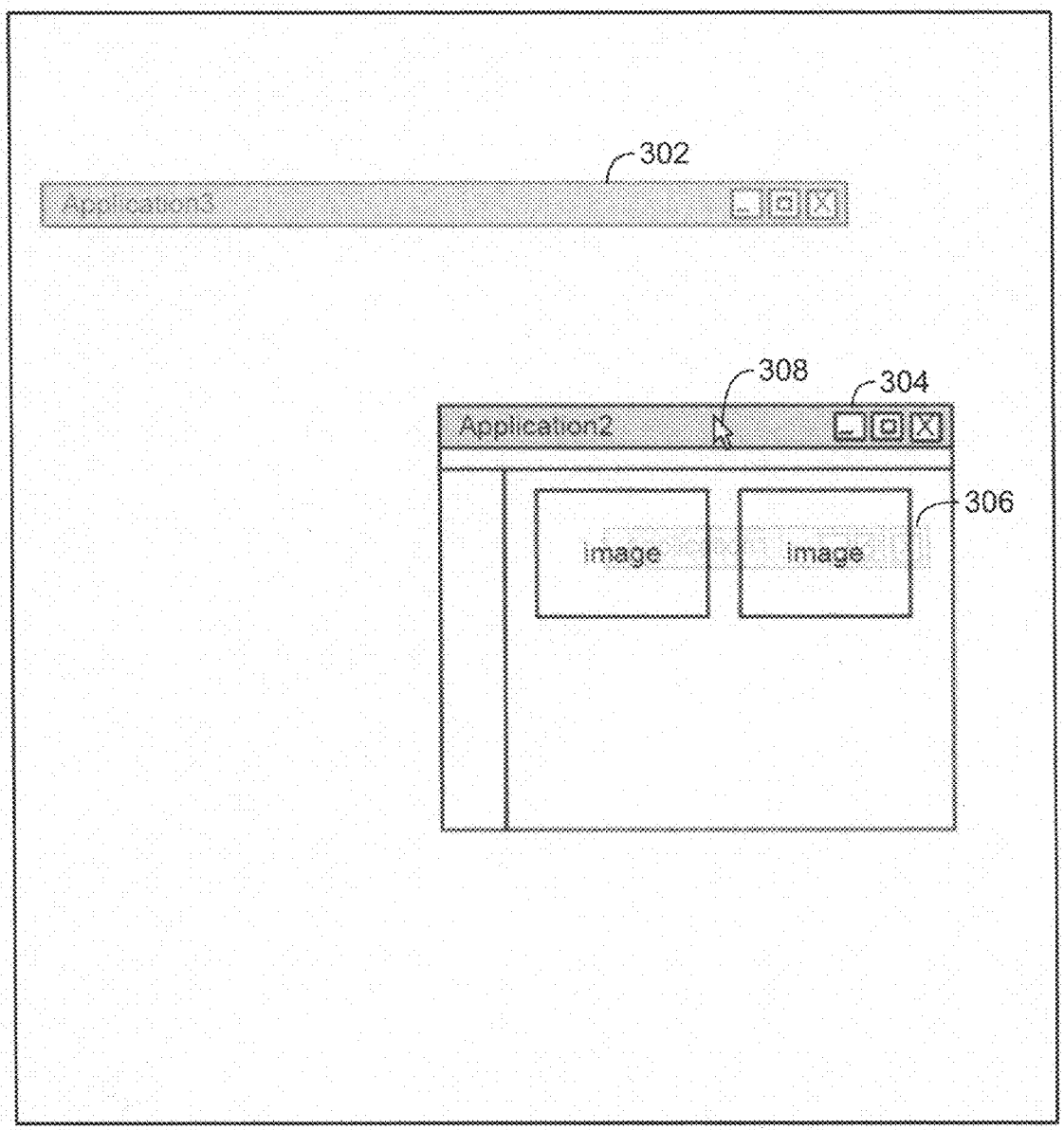
FIG. 3C is a diagram illustrating an embodiment of an interface for viewing windows when a transparency mode is enabled with different transparency values for the header and body and a cursor in a third position.

FIG. 3C is a diagram illustrating an embodiment of an interface for viewing windows when a transparency mode is enabled with different transparency values for the header and body and a cursor in a third position. In this example, a user has moved cursor 308 so that it is hovering over the header of window 304. As a result, window 304 is displayed with a transparency of 25%, while the bodies of windows 302 and 306 each remain displayed with a transparency of 100% and the headers of windows 302 and 306 each remain displayed with a transparency of 50%. In addition, in this embodiment, window 304 is brought to the top layer, e.g., to aid in selection. The other windows retain their relative stacking order.

Figure 3D:
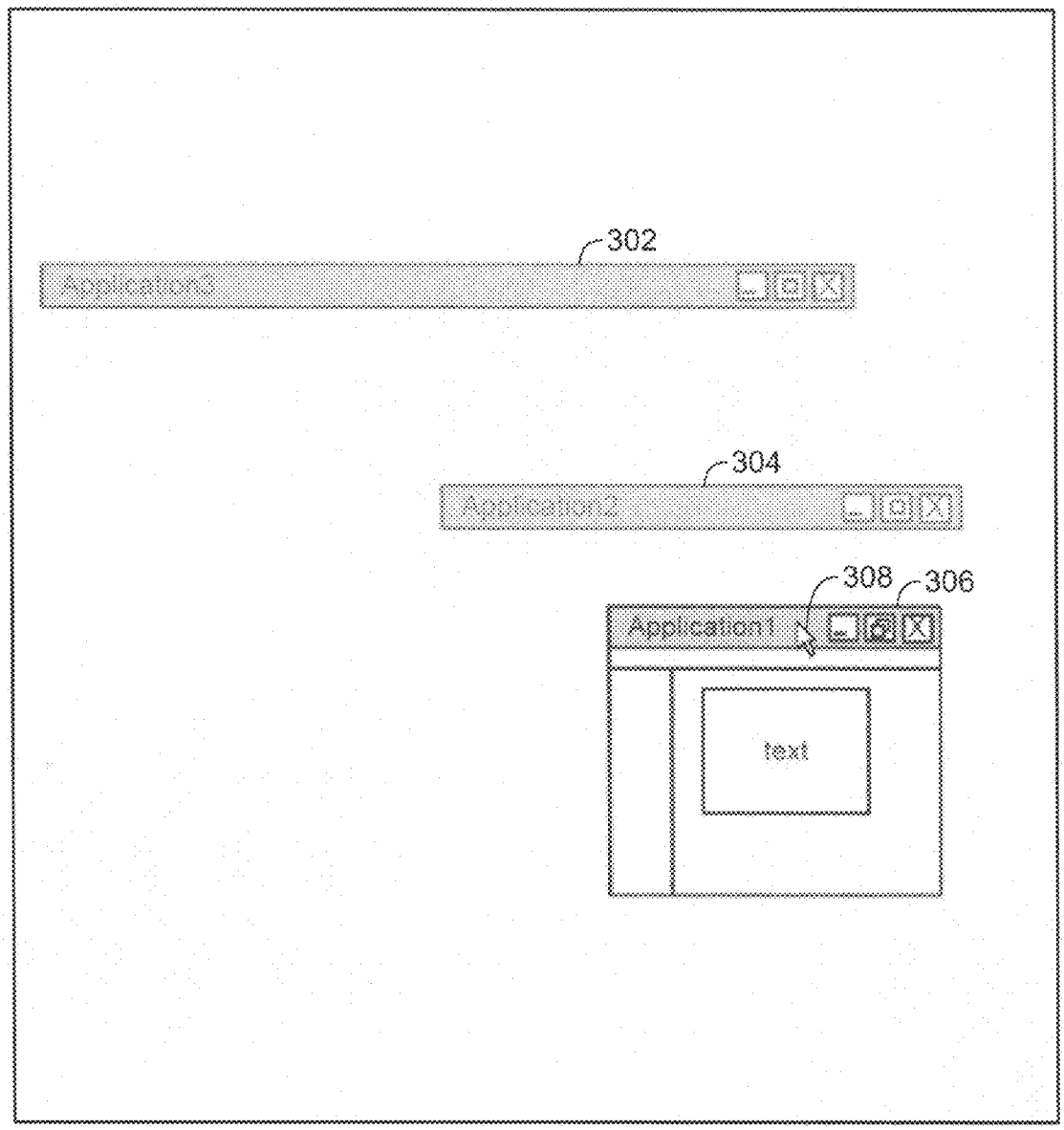
FIG. 3D is a diagram illustrating an embodiment of an interface for viewing windows when a transparency mode is enabled with different transparency values for the header and body and a cursor in a third position.

FIG. 3D is a diagram illustrating an embodiment of an interface for viewing windows when a transparency mode is enabled with different transparency values for the header and body and a cursor in a third position. In this example, a user has moved cursor 308 so that it is hovering over the header of window 306. As a result, the body of window 306 is displayed with a transparency of 25%, while the bodies of windows 302 and 304 each remain displayed with a transparency of 100% and the headers of windows 302 and 306 each remain displayed with a transparency of 50%. In addition, in this embodiment, window 306 is brought to the top layer, e.g., to aid in selection. The other windows retain their relative stacking order. In some embodiments, if window 306 is selected, transparency mode is disabled, and the display area will appear as shown in FIG. 2E.

In some embodiments, transparency mode is memoryless; that is, the transparency of a given window at any point in time depends solely on the current location of the cursor. For example, moving the cursor back to any of the positions shown in FIGS. 3A-3D, would make the display appear again as shown in FIGS. 3A-3D. In embodiments in which a window is moved up or down a layer when it is near a cursor, the window is moved back to its original layer when the cursor is moved sufficiently away.

Figure 4:
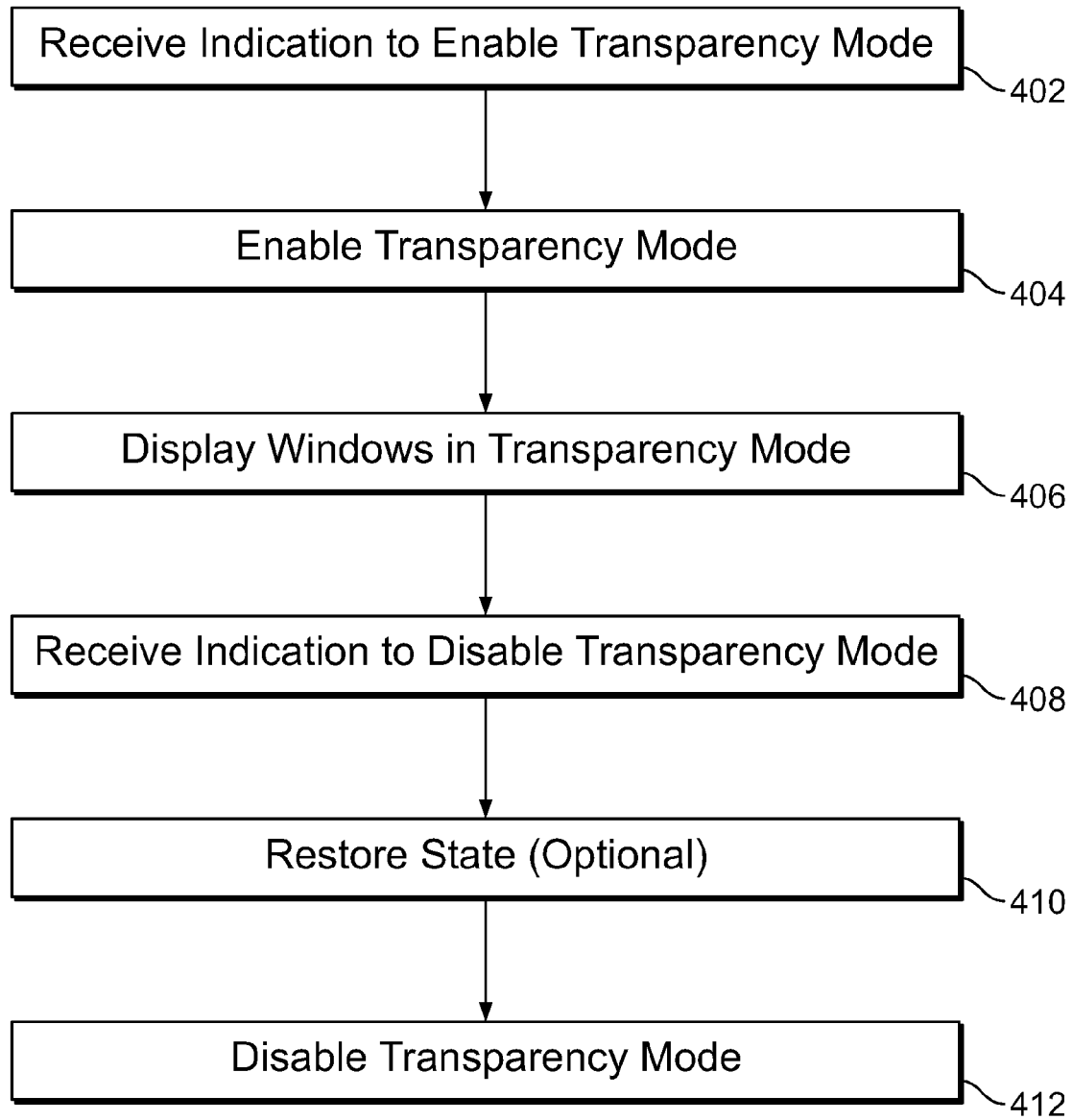
FIG. 4 is a flowchart illustrating an embodiment of a process for enabling and disabling transparency mode.

FIG. 4 is a flowchart illustrating an embodiment of a process for enabling and disabling transparency mode. At 402, an indication to enable transparency mode is received. In some embodiments, transparency mode is automatically enabled when a cursor is moved off of a window of focus (i.e., the most recently selected window) or outside the boundaries of the window of focus. In some embodiments where windows are associated with an application, when a cursor is moved off of the window within the application, transparency mode is enabled. When the cursor is then moved off of the window for the application, transparency mode is enabled at the operating system (e.g., desktop) level. In other embodiments, moving the cursor off of the window of focus within an application enables transparency mode for both the windows within the application and the windows at the operating system level. Automatic enablement of transparency mode may be enabled or disabled. For example, a user may prefer not to use transparency mode, in which case he may disable automatic enablement of transparency mode.

In some embodiments, transparency mode is manually enabled/disabled by a user. For example, an appropriate key or sequence of keys may be pressed to enable transparency mode. In some embodiments, holding down one or more keys enables transparency mode and releasing the one or more keys disables transparency mode.

At 404, transparency mode is enabled. At 406, windows are displayed in transparency mode. At 408, an indication to disable transparency mode is received. In some embodiments, transparency mode is automatically disabled when a window is selected. For example, at the operating system level, a user may select a window corresponding to a particular application to disable transparency mode at the operating system level. In some embodiments, within the application, transparency mode may still be enabled, in which case, selecting one of the windows within the application disables transparency mode within the application.

In some embodiments, transparency mode is manually disabled by a user. For example, an appropriate key or sequence of keys may be pressed to disable transparency mode. In some embodiments, holding down one or more keys enables transparency mode and releasing the one or more keys disables transparency mode.

A user may select a window a variety of ways in various embodiments. In some embodiments, a user selects a window by hovering a cursor over the header and/or body of the window and clicking. In some embodiments, clicking on a body selects the most opaque (least transparent) window beneath the cursor. In some embodiments, clicking on a header selects the most opaque header beneath the cursor.

At 410, a state is restored (optional). For example, the original stacking order just prior to or upon entering transparency mode at 404 is restored to all windows (except the selected window, which is brought to the front in some embodiments). At 412, transparency mode is disabled.

Figure 5:
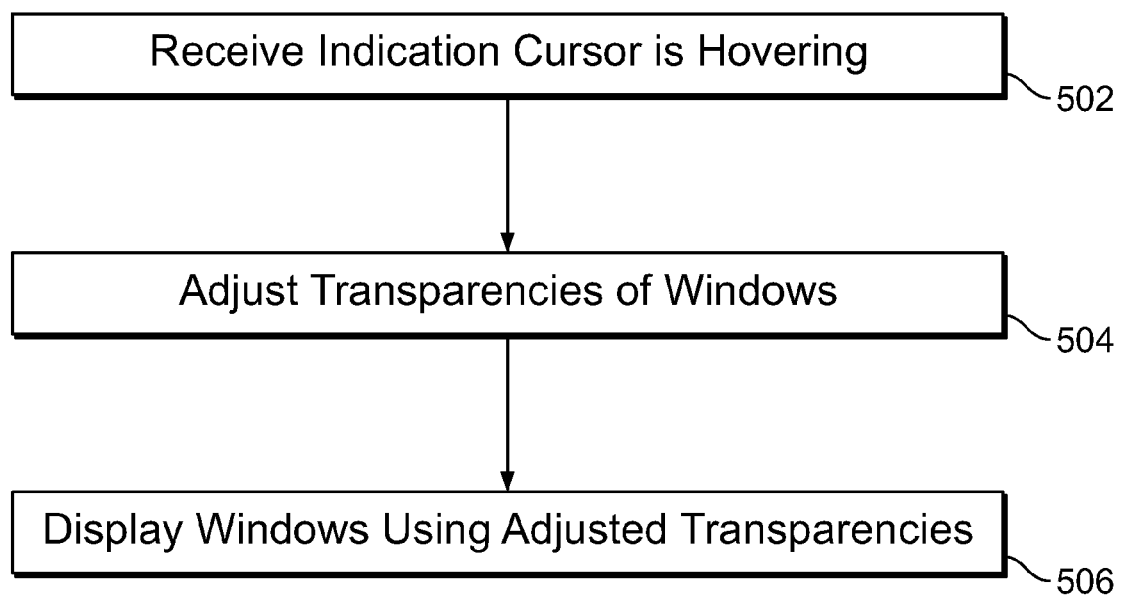
FIG. 5 is a flowchart illustrating an embodiment of a process for displaying windows in transparency mode.

FIG. 5 is a flowchart illustrating an embodiment of a process for displaying windows in transparency mode. For example, this process may be used to implement 406. At 502, an indication that a cursor is hovering is received. At 504, transparencies of windows are adjusted. For example, transparency values are computed for each window based on the cursor location. At 506, the windows are displayed using the adjusted transparencies. In various embodiments, the process of FIG. 5 may be event triggered (e.g., when cursor movement is detected or when a new cursor position is detected) or performed periodically.

Figure 6:
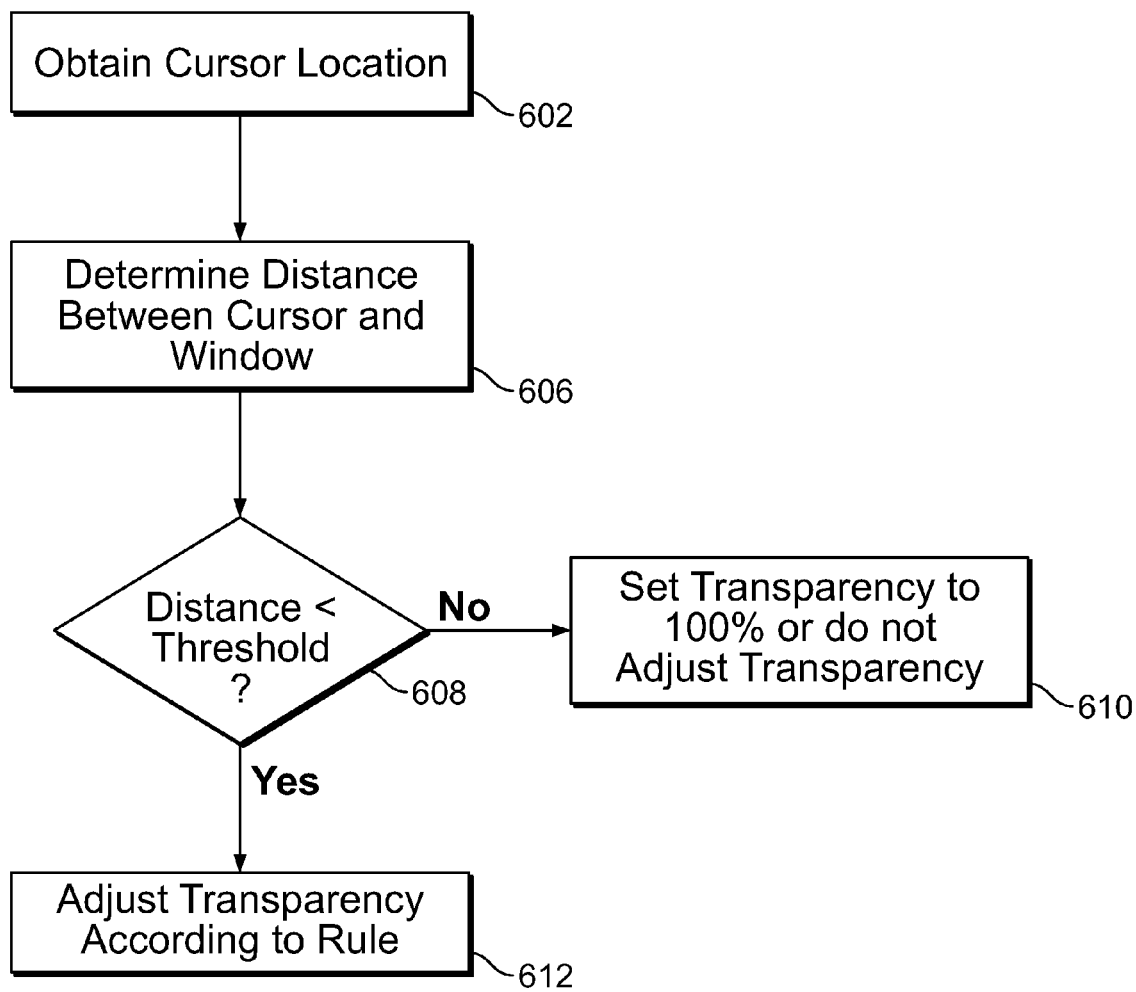
FIG. 6 is a flowchart illustrating an embodiment of a process for adjusting a transparency of a window.

FIG. 6 is a flowchart illustrating an embodiment of a process for adjusting a transparency of a window. For example, this process may be performed to implement 504. This process may be performed for each window being displayed. In some embodiments, initially, all window body transparencies are set to 100% (invisible). In some embodiments, all window header transparencies are set to 50% and are constant (i.e., not adjusted during this process).

At 602, a cursor location is obtained. At 606, a distance between the cursor and the window is determined. A variety of distances may be computed. For example, the distance between the cursor and: the center of the window, header, or body; the corner of the window, header, or body; a horizontal or vertical line through the center of the window, header, or body; or any point on the window, header, or body. For example, the closest distance between the cursor and any point on the window, header, or body is determined.

At 608, it is determined whether the distance is less than a threshold. In some embodiments, the threshold is dependent on the window size. For example, the threshold is 0.25* (width+height). If the distance is not less than a threshold, then at 610, the transparency of the window is set to 100% or not adjusted. For example, the transparency may already be at 100%. There may be a maximum transparency (such as 80%) so that if the cursor is greater than a certain distance from a window, then the window is set to have the maximum transparency.

If at 608, it is determined that the distance is less than a threshold, then at 612, the transparency is adjusted according to a rule. The transparency may be proportional to the distance. For example, the rule may be: transparency=distance/threshold. The transparency may be a function of the distance, where the function may be linear, nonlinear, continuous, a step function, etc. For example, one rule may be: If the distance is greater than x, set the transparency to 50%. If the distance is less than x, set the transparency to 25%. In some embodiments, the window closest to the cursor (e.g., with the shortest distance as measured at 606 or measured some other way) is brought to the top and/or given a transparency of 0%. In some embodiments, the stacking order of the windows is rearranged so that the window closest to the cursor is brought to the top (first layer), the window second closest to the cursor is in the second layer, the window third closest to the cursor is in the fourth layer, etc. In some embodiments, when transparency mode is disabled, the non-selected windows return to their original layering or stacking order and the selected window remains at the top. In some embodiments, a threshold (608) is not used.

In some embodiments, the examples herein apply to windows that are in a "restore down" state. A window is in a restore down state when it is not minimized and it is not maximized. In Microsoft Windows, for example, the upper right corner of a window has three buttons. The middle button (between the minimize and close buttons) can be used to toggle between the maximized state and the restore down state. In some embodiments, when transparency mode is enabled, any windows that are maximized are set to a default transparency (e.g., 80%).

Using the techniques described herein, to search for and/or select a window, the position and sizing of each of the windows does not need to be changed. The user does not need to move or resize windows in order to view each of the windows. This may be useful because a user may have some idea or memory of the approximate location or size of the window he is looking for from the last time he used that window. In addition, once the user has found a desired window, the original sizes and locations of all windows can be retained for the next time he needs to find and/or select a new window. In some embodiments, these techniques are particularly useful when there are large number of windows.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
   obtaining a cursor location associated with a user controlled cursor;
   determining, for each of a plurality of windows, a respective distance to the user controlled cursor based at least in part on the cursor location;
   determining a transparency value for each of the plurality of windows based at least in part on the respective distance, wherein determining is performed by a processor; and
   displaying the plurality of windows, wherein at least a portion of each window is displayed based on its corresponding transparency value and the window that is closest in distance is elevated to a highest layer.

2. A method as recited in claim 1, wherein at least one window at least partially overlaps at least one other window.

3. A method as recited in claim 1, wherein determining a respective distance is based on the center of a window, header, or body.

4. A method as recited in claim 1, wherein the headers of the windows have a constant transparency value that does not vary with the respective distance to the user controlled cursor.

5. A method as recited in claim 1, wherein the transparency value for a window is set to 100% when the cursor is not over the window.

6. A method as recited in claim 1, further including, in response to receiving an indication that a window is selected, disabling transparency mode.

7. A method as recited in claim 1, further including, in response to receiving an indication that a window is selected, setting the transparency value of the selected window to 0%.

8. A method as recited in claim 1, further including receiving an indication to enable transparency mode.

9. A method as recited in claim 1, further including, in response to receiving an indication to disable transparency mode, displaying all windows at 0% transparency.

10. A method as recited in claim 1, further including, in response to receiving an indication to disable transparency mode, displaying all windows except the selected window at 100% transparency.

11. A method as recited in claim 1, wherein:
    each of the plurality of windows includes a header and a body; and
    the header has a first transparency value and the body has a second transparency value.

12. A method as recited in claim 1, wherein determining the transparency value includes using a step-like function.

13. A method as recited in claim 1, wherein determining the transparency value includes using a continuous function.

14. A method as recited in claim 1, wherein the transparency value is determined when the cursor location moves from a first portion to a second portion of a display area.

15. A method as recited in claim 1, wherein a portion of the display area is cached.

16. A system, including:
    a processor; and
    a memory coupled with the processor, wherein the memory is configured to provide the processor with instructions which when executed cause the processor to:
    obtain a cursor location associated with a user controlled cursor;
    determine, for each of a plurality of windows, a respective distance to the user controlled cursor based at least in part on the cursor location;
    determine a transparency value for each of the plurality of windows based at least in part on the respective distance; and
    display the plurality of windows, wherein at least a portion of each window is displayed based on its corresponding transparency value and the window that is closest in distance is elevated to a highest layer.

17. A computer program product, the computer program product being embodied in a computer readable storage medium and comprising computer instructions for:
    obtaining a cursor location associated with a user controlled cursor;
    determining, for each of a plurality of windows, a respective distance to the user controlled cursor based at least in part on the cursor location;
    determining a transparency value for each of the plurality of windows based at least in part on the respective distance; and
    displaying the plurality of windows, wherein at least a portion of each window is displayed based on its corresponding transparency value and the window that is closest in distance is elevated to a highest layer.

18. A method as recited in claim 16, wherein at least one window at least partially overlaps at least one other window.

19. A method as recited in claim 17, wherein at least one window at least partially overlaps at least one other window.

* * * * *